UNITED STATES PATENT OFFICE.

JOHN THOMAS O'CALLAGHAN, OF LONDON, ENGLAND.

FLOUR COMPOUND AND PROCESS OF PREPARING SAME.

SPECIFICATION forming part of Letters Patent No. 559,462, dated May 5, 1896.

Application filed February 25, 1895. Serial No. 539,660. (No specimens.) Patented in England September 8, 1894, No. 17,086.

*To all whom it may concern:*

Be it known that I, JOHN THOMAS O'CAL-LAGHAN, a subject of the Queen of Great Britain, residing at London, in the county of Middlesex, England, have invented certain new and useful Improvements in the Manufacture of Germ Flour or Meal Used in the Preparation of Bread, Biscuits, Pastry, and the Like, (for which I have received Letters Patent in England, numbered 17,086, dated September 8, 1894;) and I do hereby declare that the following is a full, clear, and exact description of the invention, which will enable others skilled in the art to which it appertains to make and use the same.

My invention relates to the preparation of what is known as "germ" flour or meal used for the manufacture of bread, biscuits, pastry, and the like, by means of which the said bread, biscuits, pastry, and the like are rendered easily digestible and highly nourishing.

My invention is applicable both to the manufacture of white germ flour or meal and of what I may term for the purposes of this specification "yellow" germ flour or meal, and that modification of my process which I adopt for the manufacture of the said white germ flour or meal varies in certain particulars, hereinafter to be mentioned, from that modification of the process which I employ when the product desired is yellow germ flour or meal.

When I desire to produce what I for the purposes of this specification term "yellow" germ flour or meal, I proceed as follows: I take what is known as "germ" of wheat and I subject this to a dry heat of, say, 250° Fahrenheit, or thereabout, until it becomes crisp, taking care, however, not to heat it to such a degree as to cause it to be scorched or burned. I now take fifty-six pounds of the germ of wheat thus treated and thoroughly mix it with a solution consisting of three pints of a saturated solution of lime in water, to which has been added two pounds of what is known in the market as "concentrated extract of barley-malt." I then thoroughly dry this mixture at a temperature not exceeding, say, 140° Fahrenheit. This drying is simply for the purpose of driving off the moisture, which should be done sufficiently quick to prevent any chance of fermentation being set up. I then allow the material to cool, after which I mix with it, say, two hundred and twenty-four pounds of flour or fine wheaten meal. A sack of yellow germ flour or meal is thus obtained.

When the product desired is white germ-flour, I proceed in the following manner: I take, as before, fifty-six pounds of the raw germ of wheat and put it in a large vessel—such, for example, as a tub or pan—and over it I pour twelve gallons of water previously heated to a temperature of, say, 170° Fahrenheit. This I cover over closely with sacking, blanketing, or the like, for the purpose of retaining the heat, and allow the mixture to stand for about three hours, during which period it is occasionally stirred. At the end of the said period of three hours I filter or strain the mixture through a jelly-bag, after which I evaporate it down to a weight of ten pounds in a steam-heated pan or other convenient vessel. I now obtain what I may term a "liquid extract of wheaten germ." I now add to this quantity of liquid extract of wheaten germ two pounds of the concentrated extract of barley-malt and three pints of lime-water. I now take a sack—that is to say, two hundred and eighty pounds—of flour or fine wheaten meal and out of this I take such an amount as will suffice to make dough with the said mixture of liquid extract of wheaten germ, of malt-extract, and of lime-water. This dough I roll out into thin sheets, which are allowed to dry, preferably at a temperature of 140° Fahrenheit, after which these dried sheets are ground to a fine powder. This powder I then mix with the remainder of the two hundred and eighty pounds or sack of flour or fine wheaten meal, and I thus obtain a sack of white germ flour or meal.

In the two modifications of my process hereinbefore specified I have set forth certain relative proportions and certain temperatures. I desire it to be understood that I do not limit myself to any particular proportion or temperature, as these may be departed from a considerable extent without seriously injuring the products obtained. I have, however, found by experiment that the said temperatures and relative proportions give good results in practice, and I advise that they be adhered to or at any rate not departed from to an extent exceeding, say, ten per cent. I would particularly advise that the proportion of lime-water, which is used for the purpose of neutralizing the bitter principle of the germ, should not be exceeded, as in that case there would be a liability of subsequent fermentation being checked.

Having thus described my invention, what I claim, and desire to secure by Letters Patent, is—

1. The herein-described process of making germ flour or meal, which consists in subjecting what is known as "germ" of wheat to a dry heat until it becomes crisp, impregnating the same with a solution consisting of lime-water and concentrated extract of barley-malt, then drying it and finally mixing the product thus obtained with flour or fine wheaten meal.

2. The herein-described process of making germ flour or meal, which consists in subjecting what is known as "germ" of wheat to a dry heat of from about 225° to 275° Fahrenheit until it becomes crisp, impregnating the same with a solution consisting of lime-water and concentrated extract of barley-malt, then drying it at a temperature of from about 126° to 154° Fahrenheit and finally mixing the product thus obtained with flour or fine wheaten meal.

3. As a new article of manufacture, a food product containing thoroughly-dried germ of wheat and the product obtained from lime-water and extract of barley-malt.

4. As a new article of manufacture, a food product containing thoroughly-dried germ of wheat, the product obtained from lime-water and extract of barley-malt, and flour or fine wheaten meal.

In testimony whereof I have hereunto set my hand, this 6th day of February, 1895, in the presence of the two subscribing witnesses.

JOHN THOMAS O'CALLAGHAN.

Witnesses:
KENNETH L. SKINNER,
ATHOL G. EVANS.